No. 872,339. PATENTED DEC. 3, 1907.
J. W. GONCE.
SNAP HOOK OR LINK.
APPLICATION FILED APR. 23, 1906.
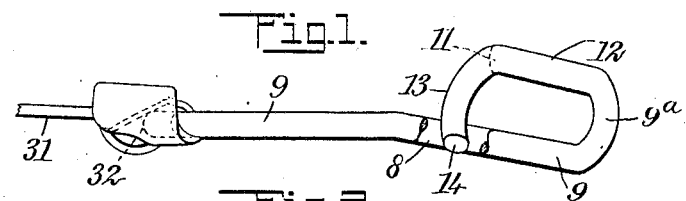
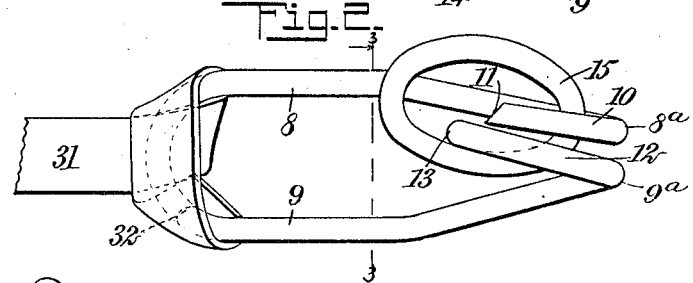
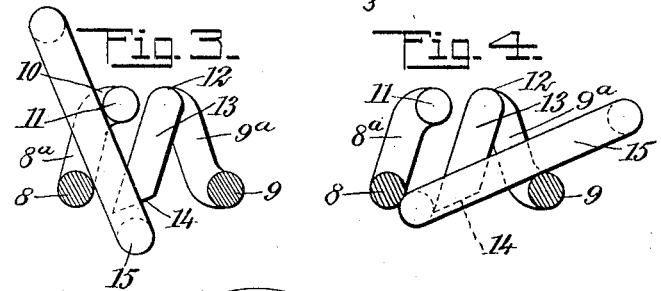
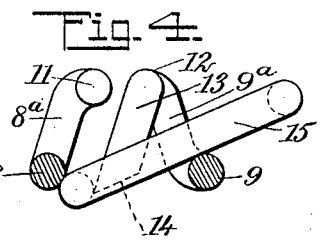
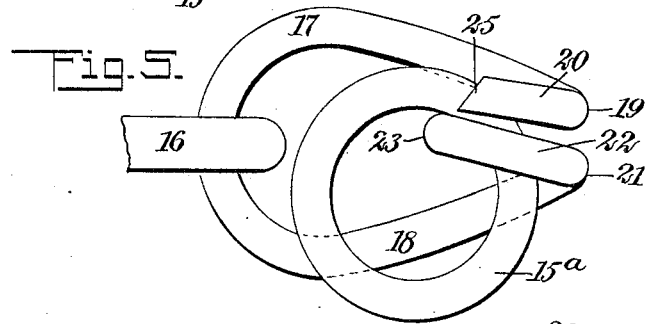
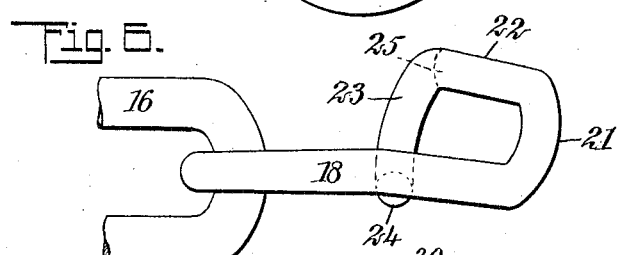
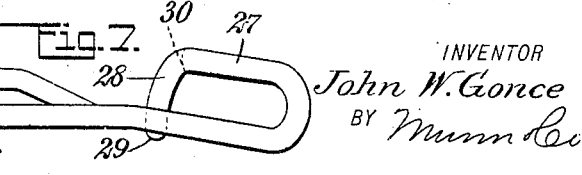
WITNESSES
L. Almquist
W. Harrison
INVENTOR
John W. Gonce
BY Munn & Co
ATTORNEYS

UNITED STATES PATENT OFFICE.

JOHN WISDOM GONCE, OF CHATTANOOGA, TENNESSEE.

SNAP HOOK OR LINK.

No. 872,339.      Specification of Letters Patent.      Patented Dec. 3, 1907.

Application filed April 23, 1906. Serial No. 313,182.

*To all whom it may concern:*

Be it known that I, JOHN W. GONCE, a citizen of the United States, and a resident of Chattanooga, in the county of Hamilton and State of Tennessee, have invented a new and Improved Snap Hook or Link, of which the following is a full, clear, and exact description.

My invention relates to snap hooks or links, my more particular object being to produce a hook in which the principal member is made of a single piece of spring wire, and in which the separable link or other member is easily connected with or disconnected therefrom at the will of the operator, and yet retains a firm connection when in actual working service. Also to produce hooks or links that may be connected together to form a chain, any member of which may be detached.

Reference is to be had to the accompanying drawings forming a part of this specification, in which similar characters of reference indicate corresponding parts in all the figures.

Figure 1 is a side elevation, partly broken away, of a snap hook made in accordance with my invention; Fig. 2 is a plan view of the same, showing the link 15 as connected with the main body member; Fig. 3 is an enlarged vertical section, upon the line 3—3 of Fig. 2, looking in the direction of the arrow, and showing how the link 15 is prevented from readily leaving the main body member; Fig. 4 is a section somewhat similar to Fig. 3, but showing the link 15 as it appears when it is being connected with or disconnected from the main body member; Fig. 5 is a plan view of a slightly different form of my invention, the main body member being here made of larger wire and having a slightly different shape; Fig. 6 is an enlarged side elevation of the device shown in Fig. 5; and Fig. 7 is a side elevation of still another form of my invention, the body portion 26 having a slight twist, and other portions being also of slightly different shapes.

The two members 8, 9, of spring metal, are integrally connected together so as to form a single body portion. The member 8 is bent slightly downward, according to the view shown in Fig. 1, and is bent upwardly at 8ª and backwardly at 10, terminating in a beveled face 11 which inclines slightly toward the principal portion of the body member 8 as will be understood from Fig. 2. The member 9 after bending at 9ª continues at 12 in a direction parallel with the principal part of the body member 9 when observed according to the view shown in Fig. 1, but forming a V therewith when seen according to the view shown in Fig. 2. This shape may be readily comprehended by imagining that the portion 12 is first made parallel with the adjacent part of the member 9 and that the structure is laid upon its back as indicated in Fig. 2, the member 12 being now moved in the direction indicated by the top of the drawing until it assumes the position indicated in said figure. The free end of the portion 12 is now bent downwardly at 13 and terminates in a beveled face 14 as indicated more particularly in Figs. 3 and 4. This beveled face 14 inclines slightly toward the member 9.

A link is shown at 15 and may be of the usual pattern. As will be observed from Figs. 3 and 4 this link is too thick to pass between the portions 11, 12, except by springing them apart. The link is inserted within the body portion as follows:—The operator seizes the link and first passes it obliquely downward intermediate of the portions 9 and 12 as will be understood from Fig. 4, so that the lower portion of the link passes along the bevel 14 and also engages the portion 8 as will be understood from Fig. 4. The operator now holds firmly upon the outer or free edge of the link (for instance, the right hand portion of Fig. 4) and twists the link a quarter turn in a clockwise direction. In doing this, he forces the link upwardly, thus first separating the portions 8 and 14, and finally prying the portions 8 and 13 away from each other, so as to permit the link to pass. This leaves the body of the link inclosed as shown in Fig. 2. The link may now be swung around into any desired position, and is prevented from accidental displacement. In order to disconnect the link 15 the operator reverses the operation just described, bringing it into such position that it can be forced gently downward so as to pry the portion 8 and the lower end of the portion 13 apart from each other as indicated by dotted lines in Fig. 4. These portions when released from the link by its passage between them snap toward each other so as to resume their normal position, and the link 15 is completely disconnected from them and from their accompanying parts.

It will be noted that the portion 10 occupies almost exactly the same plane as the adjacent portion of the spring member 8, as will be understood from Fig. 2. It will also be noted that both beveled faces 11 and 14 are slightly inclined toward the respective members 8 and 9 of which they form the terminals. The purpose of this arrangement will be seen in Fig. 3. If the link 15 should occupy the position indicated in Fig. 3, the lower portion of the link 15 is unable to pass to the left of the beveled face 14 at the lower end of the portion 13, and any strains upon the link 15 having an apparent tendency to extract the link from the other member can only result in the body portion of the link being so drawn upward against the beveled face 14 as to guide the link away from the portion 8 and thus prevent the possibility of the link becoming disconnected.

In Fig. 5, the general principle is the same, but the shapes and proportions given are suitable for a heavier form of hook. Threaded through a link 16 are spring members 17, 18, united integrally together so as to form a body portion. The member 17 is bent upwardly at 19 and backwardly at 20. The member 18 is similarly bent upwardly at 21 and backwardly at 22, and in addition is bent downwardly at 23 and terminates in a bevel face 24. The link forming the other member of the snap hook is shown at 15ª and is inserted and removed in the manner above described with reference to Figs. 1 to 4 inclusive, with the exception that intermediate of the portions 19 and 21 a sharp instrument such as a chisel or a knife, may be advantageously used so as to pry different members apart and thus assist the entry or removal of the link. The use of the knife or chisel is not necessary where the metal is comparatively light, as in Figs. 1 and 2.

In the form shown in Fig. 7, the body portion appears at 26 and is twisted slightly. The portions 27, 28, 29 and 30 are somewhat similar to the corresponding parts above described. The twist given to the portion 26 may be increased to any desired degree and is useful where the snap hook is to be used in any relation requiring that the connections occupy an angle different from that required with reference to the other figures.

For attachment of the snap hook to harness or the like, a strap 31 is provided with a single aperture 32 through which the metallic body portion is threaded, the strap being brought around and passed through its own loop as indicated in Fig. 2. If the strap is comparatively wide the aperture 32 is not visible.

From the above it will be noted that the main or permanent member of the snap hook may be readily formed from a single piece of spring wire, or from a spring or resilient metallic rod, and that the snap hook as a whole possesses a grip which is in every sense reliable. It will also be noted that owing to the structure of this main or permanent member the practical cost of making the snap hook is but little in excess of that of the cost of the wire required.

In Figs. 5 and 6 the parts are more massive and strong than in the other figures, but the principle involved is the same. The beveled faces are necessary only in case of use with round or oval rings. There may be cases wherein the beveled faces are not necessary, and this is especially true of the beveled face on the longer hooked portion.

From the above description it will be understood that aside from the detachable ring the snap hook consists practically of a body portion bent back upon itself so as to form two members integral with each other, one of these members being bent back upon itself and terminating in a bevel, the other member being longer and not only bent back upon itself, but also bent again so that its end approaches the companion member.

Having thus described my invention, I claim as new and desire to secure by Letters Patent:—

1. In a snap hook, the combination of a body portion of spring metal bent back upon itself so as to form two members, one being provided with a portion doubled upon itself and terminating in a bevel, the other being longer and provided with a further bend so as to terminate at a point substantially intermediate of said two members and ending in a bevel, each of the two said bevels being inclined slightly toward its respective members, and a link to be encircled by said bent portions.

2. In a snap hook, the combination of a metallic body portion of spring metal doubled so as to form two members, one of said members having a portion bent back upon itself; the other of said members having a longer portion bent back upon itself but slightly diverging toward the other member, and provided with a further bend, its end being thus brought into substantially the same plane as said members and provided with a bevel, and a link to be encircled by said portions thus bent backward.

3. As an article of manufacture, a snap hook member comprising a single piece of spring metal bent so as to occupy a general plane and provided with free ends, one of said ends being bent backward and terminating in a bevel, the other of said ends being bent backward and also being bent toward said plane.

4. As an article of manufacture, a single piece of spring metal bent so as to occupy a general plane and provided with free ends, one of which is bent backward so as to form a hook and terminating in a bevel, the other being longer and bent backward, and further bent toward said plane, and terminating in a bevel.

5. The combination of a metallic body portion of spring metal doubled so as to form two members occupying a general plane, one of said members having a portion bent back upon itself, the other of said members having a longer portion bent back upon itself but slightly diverging towards the other member and provided with a further bend, its end being thus brought into substantially the same plane as said two members, and a link to be encircled by both of said portions thus bent backward.

6. As an article of manufacture, a snap hook member comprising a single piece of spring metal bent so as to occupy a general plane and provided with free ends, one of said ends being bent backward, the other of said ends being bent backward and also bent toward said general plane.

7. A snap hook, comprising connected members each having bent portions converging toward one another, one of said bent portions being longer than the other and diverging toward the companion member.

8. A snap hook, comprising connected members occupying a general plane and having end portions extending outwardly from said plane, and then bent back along said members, one of said end portions being longer than the other and bent toward the companion side member.

In testimony whereof I have signed my name to this specification in the presence of two subscribing witnesses.

JOHN WISDOM GONCE.

Witnesses:
  DORA GONCE,
  Mrs. J. T. MATTHEWS.